(12) United States Patent
Li et al.

(10) Patent No.: US 10,260,550 B2
(45) Date of Patent: Apr. 16, 2019

(54) SEMI-LEFT-HAND-THREAD-REMOVAL SCREW

(71) Applicant: Chaoyi Li, Hainan (CN)

(72) Inventors: Chaoyi Li, Hainan (CN); Wenfeng Sun, Hainan (CN)

(73) Assignee: Chaoyi Li, Hainan (CN)

( * ) Notice: Subject to any disclaimer, the term of this patent is extended or adjusted under 35 U.S.C. 154(b) by 155 days.

(21) Appl. No.: 15/248,536

(22) Filed: Aug. 26, 2016

(65) Prior Publication Data
US 2017/0058935 A1 Mar. 2, 2017

(30) Foreign Application Priority Data
Aug. 26, 2015 (CN) .................... 2015 2 0649218 U

(51) Int. Cl.
| F16B 23/00 | (2006.01) |
| F16B 35/04 | (2006.01) |
| B25B 27/18 | (2006.01) |

(52) U.S. Cl.
CPC ............ F16B 35/042 (2013.01); B25B 27/18 (2013.01); F16B 23/0076 (2013.01); F16B 23/0084 (2013.01); F16B 23/0092 (2013.01)

(58) Field of Classification Search
CPC .. F16B 23/0084; F16B 23/0092; B25B 23/10; B25B 23/101
USPC .................... 411/403, 407, 409; 81/451, 454
See application file for complete search history.

(56) References Cited

U.S. PATENT DOCUMENTS

| 1,082,945 | A | * | 12/1913 | Graham | ................ | F16B 35/042 |
| | | | | | | 403/362 |
| 2,329,398 | A | * | 9/1943 | Duffy | ................. | A61B 17/8875 |
| | | | | | | 411/919 |
| 2,604,912 | A | * | 7/1952 | Walker | .................. | B25B 15/007 |
| | | | | | | 279/102 |
| 2,771,262 | A | * | 11/1956 | Laystrom | ............... | F16B 5/0258 |
| | | | | | | 174/138 D |
| 5,353,667 | A | * | 10/1994 | Wilner | .................. | B25B 15/007 |
| | | | | | | 81/436 |
| 5,857,816 | A | * | 1/1999 | Assmundson | ...... | F16B 23/0084 |
| | | | | | | 411/1 |
| 6,988,432 | B2 | * | 1/2006 | Brooks | ................. | B25B 15/008 |
| | | | | | | 411/403 |
| 7,325,470 | B2 | * | 2/2008 | Kay | .................... | A61B 17/8615 |
| | | | | | | 606/279 |

(Continued)

Primary Examiner — Flemming Saether
(74) Attorney, Agent, or Firm — Rossi, Kimms & McDowell LLP

(57) ABSTRACT

A semi-left-hand-thread-removal screw including a screw end head and a bolt, wherein a sink hole is provided on the screw end head, a lower portion of the sink hole is an inscribed polygon structure or an I-shaped structure, a thread which is opposite to the bolt is provided on an upper portion of the sink hole, the inscribed polygon structure is an inscribed hexagon. A screw according to aspects of the disclosure may be screwed in with a common inscribed hexagon screwdriver and an inscribed hexagon structure thereof which are embedded into each other; the screw can be unscrewed with a left-hand-thread screwdriver which is matched with a left-hand-thread structure thereof and screwed in the left-hand-thread structure thereof, after the left-hand-thread screwdriver is screwed in tightly, the screwdriver is continuously co-rotated and then the screw may be unscrewed.

13 Claims, 5 Drawing Sheets

(56) References Cited

U.S. PATENT DOCUMENTS

| | | | | |
|---|---|---|---|---|
| 7,901,413 B1* | 3/2011 | Lewis | ................ | A61B 17/8888 |
| | | | | 411/406 |
| 8,156,847 B2* | 4/2012 | Hawkes | ................ | B25B 13/44 |
| | | | | 81/444 |
| 9,044,843 B1* | 6/2015 | Mokhtee | ............... | B25B 15/004 |
| 2005/0216015 A1* | 9/2005 | Kreidler | ............. | A61B 17/8605 |
| | | | | 606/916 |
| 2010/0269644 A1* | 10/2010 | Edland | ................. | B25B 15/005 |
| | | | | 81/460 |

* cited by examiner

SEMI-LEFT-HAND-THREAD-REMOVAL SCREW

TECHNICAL FIELD OF THE INVENTION

This disclosure relates to a screw, particularly to a semi-left-hand-thread-removal screw.

TECHNICAL BACKGROUND OF THE INVENTION

A screw is a fastener commonly used in an industrial industry, an electrical industry, a medical industry, a construction industry and other industries. The screw may tightly lock a screw cap or other items; however, when the screw is difficult to be unscrewed, a simple operation may cause big difficulty; sometimes, the screw may be removed only when the item is damaged. Currently, a commonly used screw cap groove is "I-shaped", "cross-shaped", an inscribed hexagon, a quincunx and so on, the most common reason why these screws are difficultly unscrewed is that a screwdriver head slips in a screw cap groove, there are several following slipping reasons: 1) the screw cap groove has been damaged before the screw is screwed in; 2) because the screw has been retained for a long time and become rusted, or due to other reasons, the screw is required to overcome bigger resistance to be unscrewed, and hence the possibility of screw slippage increases; 3) the operator fails to rotate the screwdriver around a screw shaft due to improper operation so that the screw is taken off when being unscrewed, therefore, the screw cap groove is damaged, resulting in slippage. If the screw is slipped, it will be difficult to be unscrewed immediately, if the operator wants to unscrew the screw, not only it consumes time and labor, but also the screw cannot be unscrewed ultimately. It is thus obvious that the slippage caused when the screw is unscrewed has become a problem to be solved urgently. So far, there is no way to effectively solve the problem of screw slippage.

SUMMARY OF THE INVENTION

At least some embodiments of the disclosure provide a semi-left-hand-thread-removal screw which can solve the slippage problem in the prior art caused when the screw is unscrewed.

A screw according to aspects of this disclosure may include a screw end head and a bolt, a sink hole is provided on the screw end head, a lower portion of the sink hole is an inscribed polygon structure or an I-shaped structure, a thread, preferably a left-hand thread which is opposite to the screw is provided on an upper portion of the sink hole.

The inscribed polygon structure may be an inscribed hexagon, an inscribed quadrate or a quincunx.

The semi-anti-thread-removal screw comprises a bolt which may be a screw shank having a thread. The thread of the screw shank is in opposite or reverse direction to the thread of the upper portion of the sink hole. The upper portion of the sink hole may include a left-hand thread and the screw shank may include a right-hand thread.

Aspects of this disclosure provide a semi-anti-thread-removal screw comprising a screw shank and a screw end head, a sink hole is provided on the screw end head, a lower portion of the sink hole is an inscribed polygon structure or an I-shaped structure, a thread is provided on an upper portion of the sink hole being opposite to the thread of the screw shank. The thread provided on an upper portion of the sink hole may be a left-hand thread.

The screw according to aspects of this disclosure can be screwed in with a common screwdriver having an appropriate shape with regard to the lower portion of the sink hole. Furthermore, a special screwdriver can be used as explained with regard to the screwing out of the screw.

Especially in cases that the screw is difficult to be unscrewed, a special screwdriver could be used that can be screwed on the thread being provided on an upper portion of the sink hole. Screwing on of the special screwdriver can be achieved by a rotatable part of the special screwdriver after the special screwdriver has been inserted into the lower portion of the sink hole.

An inscribed hexagon screw is taken as an example to carry out the description:

The screw according to aspects of this disclosure has the following characteristics and use ways: the semi-left-hand-tread-removal screw can be screwed in with a common inscribed hexagon screwdriver and an inscribed hexagon structure thereof which are embedded into each other; the screw can be unscrewed with a left-hand-thread screwdriver which is matched with a left-hand-thread structure thereof and screwed in the left-hand-thread structure thereof, after they are screwed in tightly, the screwdriver is continuously co-rotated and then the screw may be unscrewed. Therefore, when the screw according to aspects of this disclosure is unscrewed, the screw may be rapidly and effectively unscrewed no matter whether a screw cap groove is slipped.

DRAWINGS OF THE INVENTION

Figure 1:
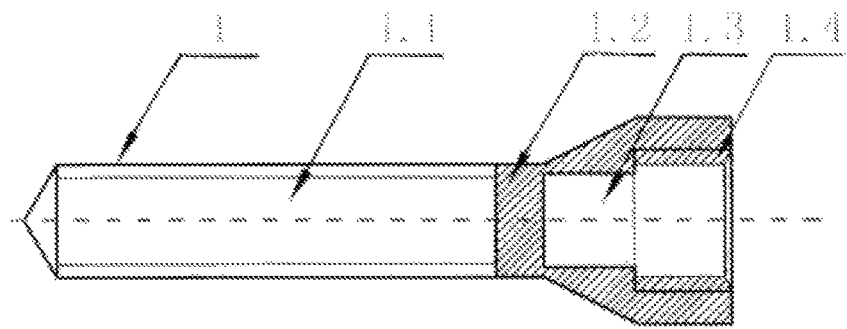
FIG. 1 is a main sectional view of a screw portion structure in a screw according to an exemplary embodiment of this disclosure.
Figure 8:
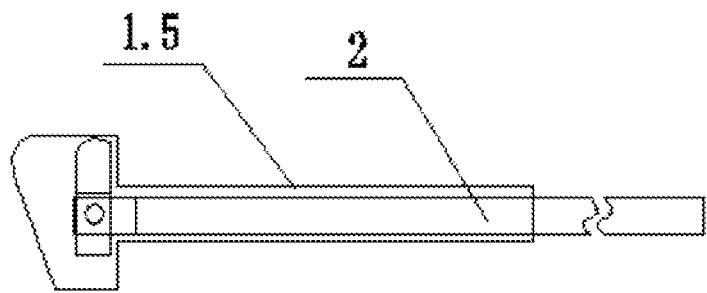
FIG. 8 is a diagram that a pulling-out tool extends into a pulling-out hole and begins to be pulled out.
Figure 9:
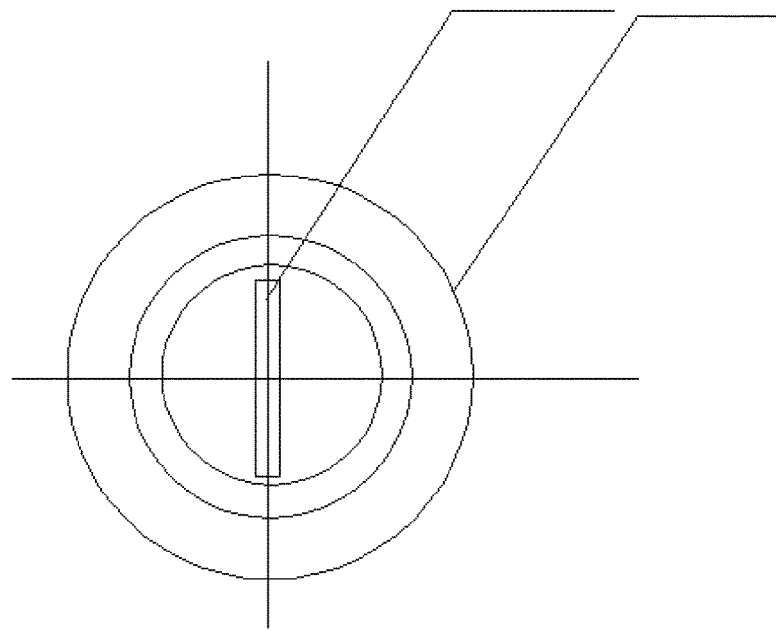
Figure 10:
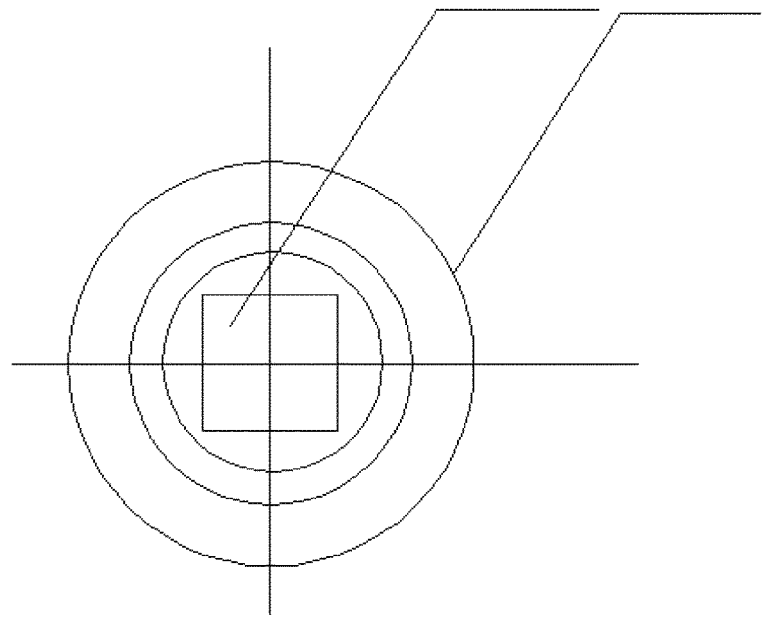

FIGS. 8, 9, and 10 are right views of FIG. 1 showing examples of a screw structure.

EMBODIMENTS OF THE INVENTION

With the combination of the following drawings, a screw according to aspects of this disclosure may be further described as follows:

Embodiment 1

Figure 2:
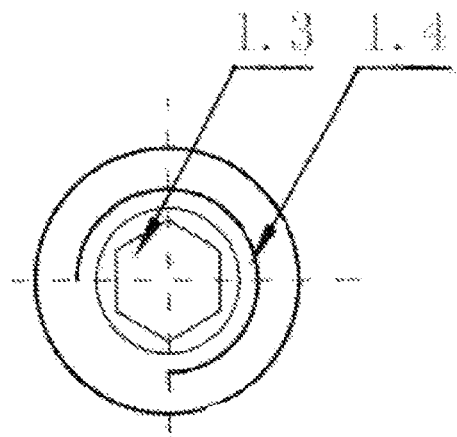
FIG. 2 is a right view of FIG. 1.
Figure 3:
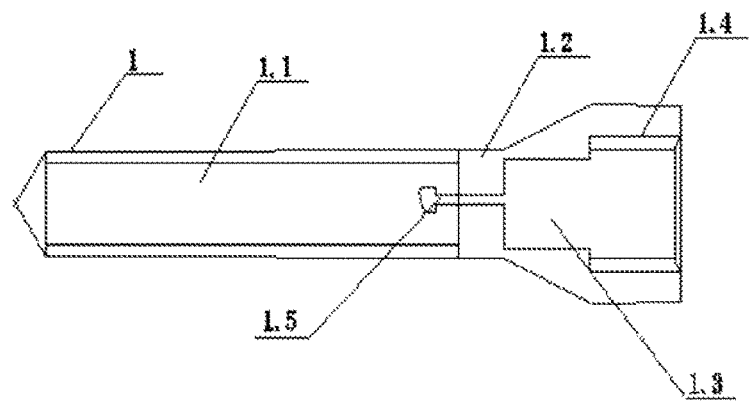
FIG. 3 is a structure diagram of Example 2.
Figure 4:
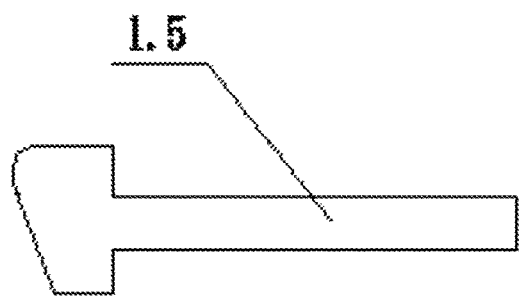
FIG. 4 is an enlarged diagram of a pulling-out hole of Example 2.
Figure 5:
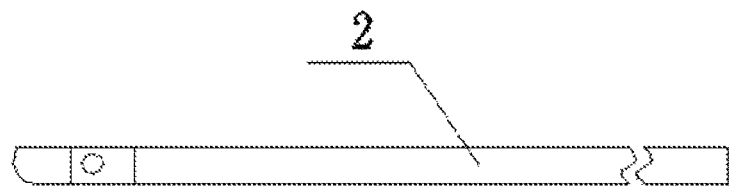
FIG. 5 is a structural diagram of a pulling-out tool cooperating with a pulling-out hole in Example 2.

As shown in FIGS. 1, 2: a semi-left-hand-thread-removal screw may include a screw end head 1.2 and a bolt 1.1, which may include a right-hand thread, wherein a sink hole is provided on the screw end head 1.2, a lower portion of the sink hole may be an inscribed hexagon structure 1.3, a left-hand thread 1.4, which is opposite to the thread of the screw, is provided on an upper portion of the sink hole.

Embodiment 2

Figure 6:
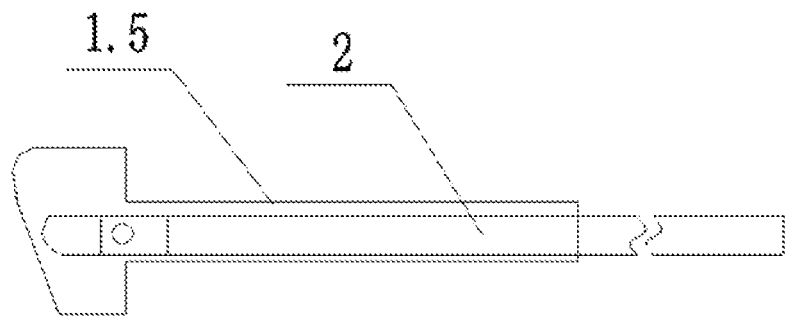
FIG. 6 is a diagram that a pulling-out tool extends into a pulling-out hole.
Figure 7:
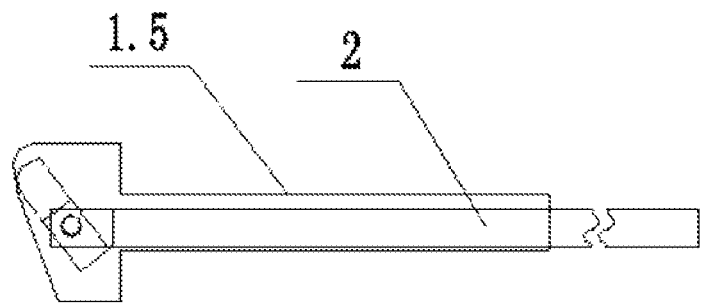
FIG. 7 is a diagram that a pulling-out tool extends into a pulling-out hole and is deformed.

As shown in FIGS. 3, 4, 5, 6, 7, and 8, a semi-left-hand-thread-removal screw may include a screw end head 1.2 and a bolt 1.1, a sink hole is provided on the screw end head 1.2, a lower portion of the sink hole is an inscribed hexagon structure 1.3, a left-hand thread 1.4, which is opposite to the thread of the bolt, is provided on an upper portion of the sink hole, a pulling-out hole 1.5 is provided along the bolt 1.1 at a center of a bottom portion of the sink hole, a cross section of the pulling-out hole 1.5 is a like-hammer-shape. A pulling-out tool 2 may be inserted into the pulling-out hole 1.5 in an operation to remove the screw 1. For example, the pulling-out tool 2 may be a metal rod of which a front-end shaft is connected with a sliding pin. FIG. 6 is a diagram of the pulling-out tool 2 extending into the pulling-out hole 1.5. When the front end of the pulling-out tool 2 contacts the bottom portion of the pulling-out hole 1.5, the sliding pin starts to slide and rotates along a shaft core to be the shape of FIG. 7, and finally becomes the form of FIG. 8, in which case an outward force may be exerted on the screw to thereby pull on screw.

According to different conditions, combining with an inscribed hexagon structure tool or a left-hand-tread rotation tool, on one hand, the pulling-out tool exerts the outward force on the screw, on the other hand, combining with other tools, a self-rotation force of a thread is realized, thus being able to more easily pull out the screw.

A shaft core of the inscribed hexagon structure tool or the left-hand rotation tool may be provided with a cavity, an end of the pulling-out tool 2 passes through the cavity, the combination with the inscribed hexagon structure tool or the left-hand-thread rotation tool may be realized, the outward force of the pulling-out tool 2 may be extended and turned via a plurality of conditions such as a fine wire, the screw better exits according to specific conditions.

Figure 11:
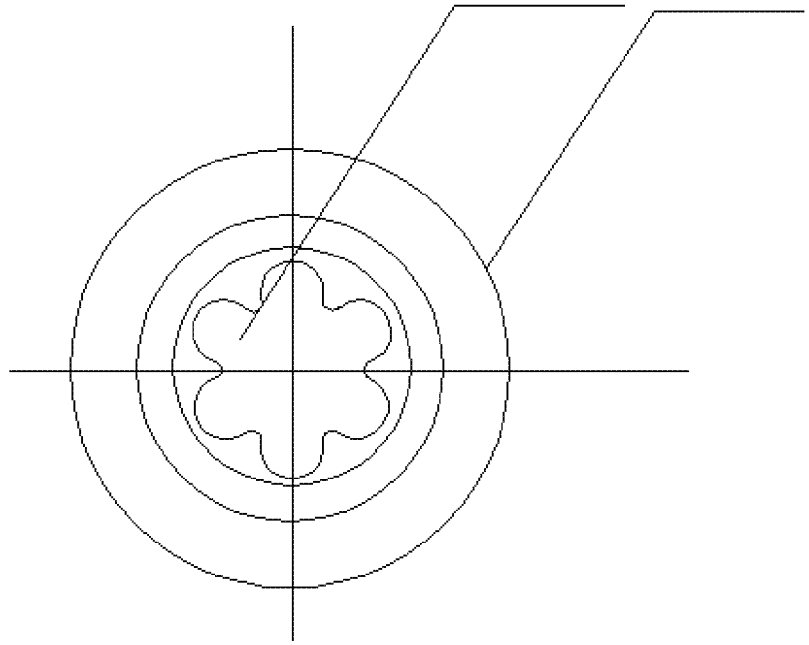

Referring to FIG. 9, a lower portion of the sink hole is an I-shaped structure 1.3a, referring to FIG. 10, a lower portion of the sink hole is an inscribed polygon structure such as a quadrate structure 1.3b, and referring to FIG. 11, a lower portion of the sink hole is a structure such as a quincunx 1.3c.

The invention claimed is:

1. A screw, comprising:
a screw end head;
a bolt having a thread;
a sink hole provided on the screw end head and a thread, which is opposite to the thread of the bolt, is provided on an upper portion of the sink hole; and
a pulling-out hole provided along the bolt at a center of a bottom portion of the sink hole,
wherein a cross section of the pulling-out hole is hammer-shaped.

2. The screw according to claim 1, wherein a lower portion of the sink hole is an inscribed hexagon.

3. The screw according to claim 2, wherein the thread provided on the upper portion of the sink hole is a left-hand-thread.

4. The screw according to claim 1, wherein a lower portion of the sink hole is an inscribed quadrate or a quincunx.

5. The screw according to claim 4, wherein the thread provided on the upper portion of the sink hole is a left-hand-thread.

6. The screw according to claim 1, wherein the thread provided on the upper portion of the sink hole is a left-hand-thread.

7. The screw according to claim 1, wherein a lower portion of the sink hole is an I-shaped structure.

8. The screw according to claim 1, wherein the pulling-out hole is configured to receive a pulling-out tool.

9. The screw according to claim 8, wherein the pulling-out hole is configured to receive the pulling-out tool including a metal rod having a front-end shaft connected with a sliding pin.

10. The screw according to claim 1, wherein the pulling-out hole is a thread-less hole.

11. The screw according to claim 1, wherein the pulling-out hole includes a first distal end located at the center of the bottom portion of the sink hole and a second distal end located in the bolt.

12. The screw according to claim 11, wherein:
the first distal end of the pulling-out hole has a first width in a direction perpendicular to an extending direction of the bolt,
the second distal end of the pulling-out hole has a second width in the direction perpendicular to the extending direction of the bolt, and
the second width of the second distal end of the pulling-out hole is greater than the first width of the first distal end of the pulling-out hole.

13. A screw, comprising:
a screw end head;
a bolt having a thread;
a sink hole provided on the screw end head and a thread, which is opposite to the thread of the bolt, is provided on an upper portion of the sink hole; and
a pulling-out hole provided along the bolt at a center of a bottom portion of the sink hole,
wherein:
the pulling-out hole includes a first distal end located at the center of the bottom portion of the sink hole and a second distal end located in the bolt,
the second distal end of the pulling-out hole forms a bottom of the pulling-out hole,
the bottom of the pulling-out hole has a first depth in an extending direction of the bolt at a first location of the second distal end,
the bottom of the pulling-out hole has a second depth in the extending direction of the bolt at a second location of the second distal end, and
the first depth at the first location of the second distal end of the pulling-out hole is greater than the second depth at the second location of the second distal end of the pulling-out hole.

* * * * *